(12) United States Patent
Rustad

(10) Patent No.: US 7,377,014 B2
(45) Date of Patent: May 27, 2008

(54) DEVICE FOR HANGING CORDS FROM A STRUCTURE

(76) Inventor: Jeanine Rustad, 410 Portola St., San Dimas, CA (US) 91773

( * ) Notice: Subject to any disclaimer, the term of this patent is extended or adjusted under 35 U.S.C. 154(b) by 3 days.

(21) Appl. No.: 11/282,171

(22) Filed: Nov. 18, 2005

(65) Prior Publication Data

US 2007/0113381 A1 May 24, 2007

(51) Int. Cl.
*F16G 11/00* (2006.01)
*F16G 11/04* (2006.01)

(52) U.S. Cl. .................................. 24/115 G; 24/136 R

(58) Field of Classification Search ............. 24/115 G, 24/598.1–598.4, 598.7, 600.4–600.8, 601.6, 24/136 K, 136 R, 712.1, 712.2, 712.4, 712.5, 24/712.9; 248/48.1, 59, 62, 74.1
See application file for complete search history.

(56) References Cited

U.S. PATENT DOCUMENTS

| | | | | | |
|---|---|---|---|---|---|
| 714,144 | A | * | 11/1902 | Chapman | .................. 24/136 R |
| 2,482,625 | A | * | 9/1949 | Kunkel | ......................... 24/523 |
| 2,530,518 | A | * | 11/1950 | Girard | ........................ 24/600.6 |
| 2,970,596 | A | * | 2/1961 | Hamilton | .................. 24/600.6 |
| 3,714,684 | A | * | 2/1973 | Gley | ......................... 24/600.6 |
| 5,156,430 | A | * | 10/1992 | Mori | ......................... 24/600.6 |

\* cited by examiner

*Primary Examiner*—Robert J. Sandy
*Assistant Examiner*—Ruth C. Rodriguez
(74) *Attorney, Agent, or Firm*—Denton L. Anderson; Sheldon Mak Rose & Anderson PC

(57) ABSTRACT

A device for hanging one or more cords, such as cables or ropes used to hang banners or electrical wires used to hang strings of decorative lights, includes (a) an elongate housing, (b) an interior member which is slidably disposed within the housing, and (c) biasing means, such as a coil spring. The interior member defines a notch proximate to its forward end. The notch is sized to accept and retain at least one cord. The interior member is slidable within the housing between a closed position and an open position. The biasing means is adapted to bias the interior member towards the closed position. When a cord is disposed within the notch, the biasing of the interior member towards the closed position firmly attaches the cord to the device.

20 Claims, 3 Drawing Sheets

DEVICE FOR HANGING CORDS FROM A STRUCTURE

FIELD OF THE INVENTION

This invention relates generally to devices for hanging cords, such as cables, ropes and electrical wires.

BACKGROUND

Hanging cords, such as cables or ropes for bearing banners or electrical wires for bearing strings of holiday lighting, is a tedious and awkward affair. Ad hoc methods of attaching cords, for example with screws, nails or other metal fasteners, are time consuming and it may be dangerous if improperly employed. Moreover, such ad hoc fasteners are generally unsightly and need to be removed from the house or structure when the cords are taken down. Specialty hangers for hanging such cords have been proposed in the past. However, most such specialty hangers are also difficult to install, and tend to be unsightly, especially once the decorative lighting is removed.

Accordingly, there is a need for a new device capable of hanging such cords which avoids the aforementioned problems in the prior art.

SUMMARY

The invention satisfies this need. The invention is a device useful in the installation and removal of cords, such as cables or ropes for hanging banners or wires for supporting strings of decorative lights, to and from a house or other structure. The device comprises: (a) an elongate housing having a forward end, a rearward end, a length of between about ½ inch and about 3 inches and a maximum thickness of between about ¼ inch and 1 inch; (b) an interior member slidably disposed within the housing, the interior member having a forward end, a rearward end, and a notch defined proximate to its forward end, the notch being sized and dimensioned to accept and retain at least one electrical wire, the interior member being slidable within the housing between (i) a closed position wherein the notch is at least partially disposed within the housing and (ii) an open position wherein the notch is disposed sufficiently outside of the housing to allow its access to an electrical wire; and (c) biasing means disposed within the housing and adapted to bias the interior member towards the closed position. When a cord is disposed within the notch, the biasing of the interior member towards the closed position firmly attaches the cord to the device.

This invention provides a system to easily install and remove such a cord to and from a house or other structure. The system is particularly intended for attachment to the eaves of the house, but could be used to attach light strings to a variety of surfaces found on building or structures.

In a preferred embodiment, the device is comprised of three distinct components, a round cylinder-like ribbed outer housing to encase a second separate, smaller diameter cylinder with integrally molded hook and further shaped to support an internal spring action, which when compressed exposes said hook. The hook, once fully exposed, is capable of loosely accepting the cord, then with removal of thumb pressure, slidably retracts to grab and secure hold the cord in place. In this preferred embodiment, the operating means is a thumb actuated slider. The user slides his or her thumb behind the eave to contact the actuator end of the smaller hooked cylinder. The thumb pressure is then removed to allow the slidable cylinder to move back toward the actuator end of the hanger. In the preferred embodiment, the open jaw of the hook assembly is spring loaded and biased in the normally closed position.

The device is ideally comprised of three separate pieces before assembly. The first is a cylinder with the inside precisely honed to leave one of the flat sides with a smaller hole for the hook to expose itself for retraction, and the other flat side with a larger opening for inserting second cylinder (shaft) with hook. A spring is inserted to fit tightly inside and between said cylinder and shaft. The spring enables the hook to extract from the housing and then retract to grab a cord or to retract to original flush origin before a cord is inserted. When the button is pressed, it compresses the internal spring to expose the hook (which is part of the inner cylinder) from the flush side to retain the desired cord and retract securely to hold the cord. For removal, the reverse process is followed.

DRAWINGS

DETAILED DESCRIPTION

Figure 1:
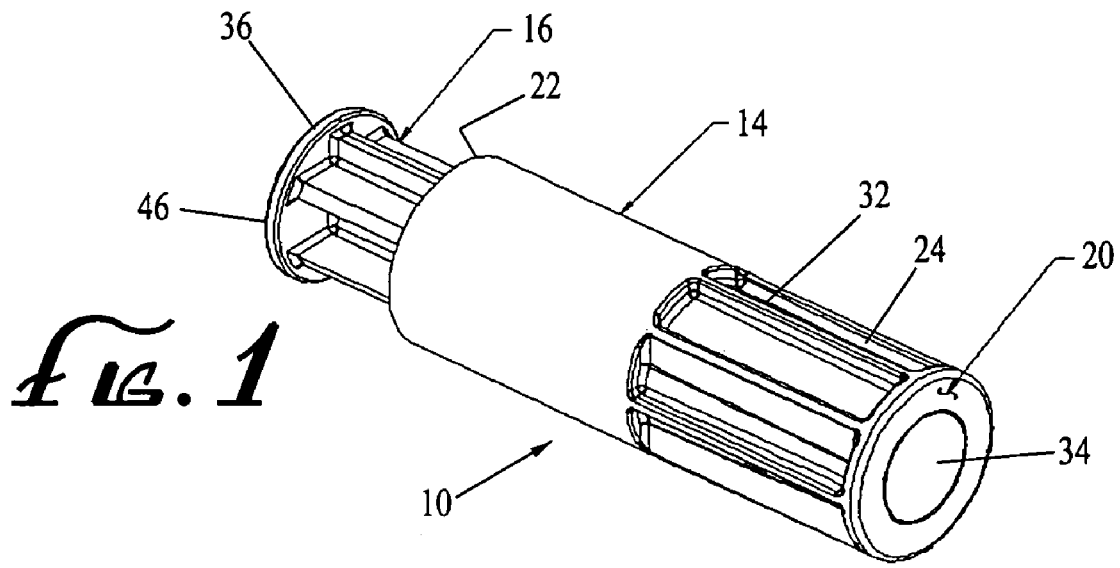
FIG. 1 is a perspective view of a device having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a device 10 used for in the installation and removal of thin cords 12, such as cables and ropes for hanging banners or electrical wires for hanging strips of holiday lighting or decorative lights. The invention comprises an elongate housing 14, an interior member 16 and biasing means 18.

Figure 2:
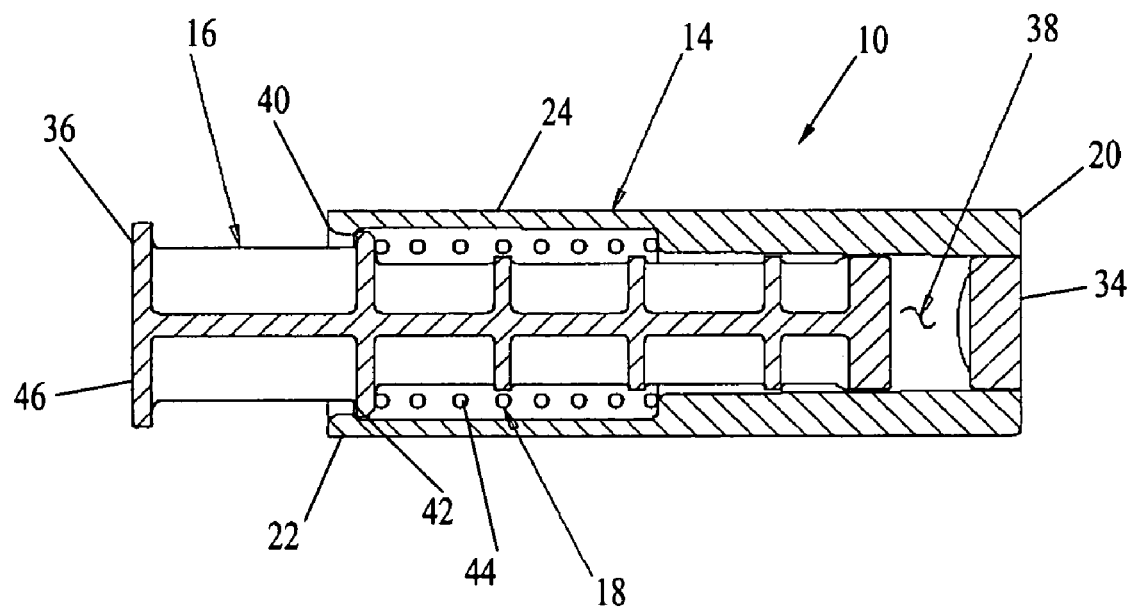
FIG. 2 is a cross-sectional side view of the device illustrated in FIG. 1.
Figure 3:
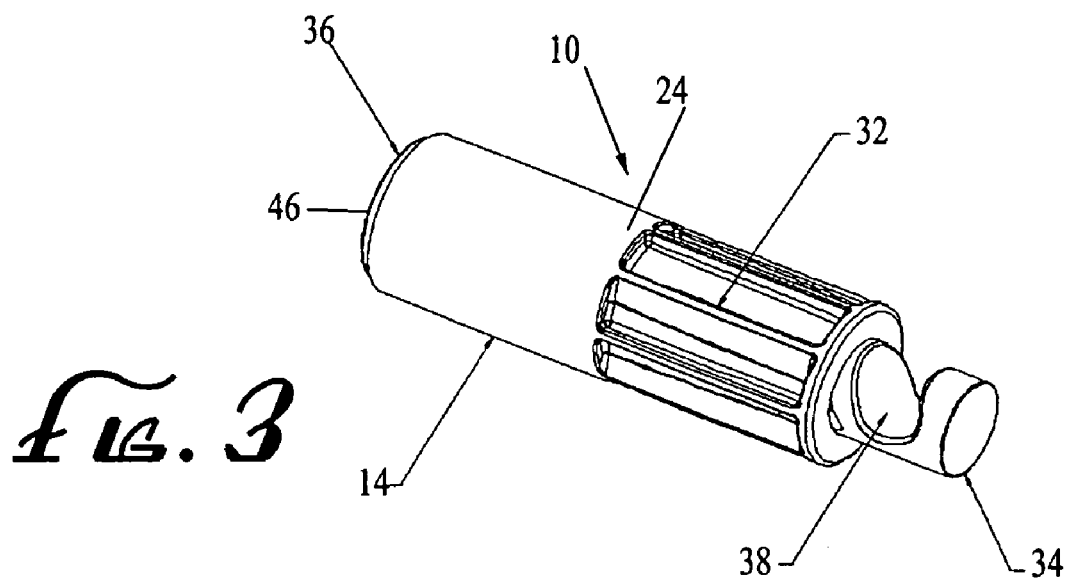
FIG. 3 is a second perspective view of the device illustrated in FIG. 1, illustrating a retaining notch disposed in an open position.

As illustrated in FIGS. 1-3, the elongate housing 14 has a forward end 20 and a rearward end 22. Typically, the elongate housing 14 has a cylindrical exterior surface 24 with a circular cross-section. Such an elongate housing 14 is easily disposed within a bore 26 of uniform diameter.

The elongate housing 14 has a maximum thickness sufficient to house the interior member 16. Typically, the elongate housing 14 has a circular cross-section with a generally uniform maximum thickness between about ¼ inch and about 1 inch, most typically between about ¼ inch and about ½ inch.

Preferably, the elongate housing 14 is slightly tapered, such that the forward end 20 is slightly larger than the rearward end 22. Such a slightly tapered configuration facilitates the press fit installation of the device within a bore 26 of constant diameter.

The elongate housing 14 has a length typically calculated to closely match the thickness of an exposed beam 28 in the house or other structure. Such exposed beam 28 is typically an eave 30 of the house or other structure. Accordingly, the elongate housing 14 has a length typically between about ½ inch and about 3 inches, most typically between about 1 inch and about 2 inches.

Preferably, the elongate housing 14 has an external surface which defines a plurality of spaced apart longitudinal ribs 32. Such longitudinal ribs 32 facilitate the press fit of the elongate housing 14 into a bore 26 having a nearly matching diameter. The longitudinal ribs 32 provide for superior retention at assembly into the eaves 30 of a house, or other structure, without a compressive failure of the cylinder wall that might otherwise cause the webbed cylinder-like surface of the interior member 16 to jam within the elongate housing 14.

The interior member 16 is slidably disposed within the elongate housing 14. The interior member 16 has a forward end 34 and a rearward end 36. Defined proximate to the forward end 34 is a notch 38. The notch 38 is sized and dimensioned to accept and retain at least one cord 12, such as a thin cable, rope or electrical wire.

The interior member 16 is slidable within the elongate housing 14 between (i) a closed position, wherein the notch 38 is at least partially disposed within the housing 14 and (ii) an open position, wherein the notch 38 is disposed sufficiently outside of the housing 14 to allow its access to a cord 12 (as illustrated in FIG. 3). Typically, the notch 38 is wholly disposed within the housing 14 in the closed position and fully disposed outside of the housing 14 in the open position.

In a typical embodiment, the forward end 34 of the interior member 16 is disposed flush with the forward end 20 of the elongate housing 14 wherein the interior member 16 is disposed in the closed position. In the embodiments illustrated in the drawing, the rearward end 34 of the interior member 16 protrudes rearwardly beyond the rearward end 22 of the elongate housing 14 when the interior member 16 is disposed in the closed position.

An optional snap ring (not shown), integrally molded to the elongate cylinder 14, can be used to act as a plastic retaining washer to engage a stepped down groove, so that, once inserted into the elongate housing 14, the forward end 34 of the interior member 16 is flush with the forward end 20 of the housing 14 and is permanently retained.

As illustrated in FIG. 2, the interior member 16 is retained within the elongate housing 14 by a molded ring-like shoulder 40 defined on the interior member 16. Such ring-like shoulder 40 is held in intimate contact with a retaining shoulder 42 which is defined on the interior of the elongate housing 14 by the biasing means 18 when the interior member 16 is in the closed position.

Preferably, the interior member 16 is rotatable within the elongate housing 14. This feature facilitates the attachment of cords 12 disposed at various angles.

Preferably the notch 38 is hook-shaped as illustrated in the drawings. Such hook shape facilitates the firm retention of one or more cords 12 within the notch 38 when the interior member 16 is biased towards the closed position. The notch 38 is ideally smooth radiused in cross-section shape to minimize bending stresses and in the preferred embodiment is molded integral with the interior member 16 and is used to support and capture the one or more cords 12.

The biasing means 18 is a coil spring 44 in the embodiments illustrated in the drawings. Other biasing means can also be used. As noted, the biasing means 18 biases the interior member 16 towards the closed position.

Typically, the elongate housing 14 and the interior member 16 are made of a plastic material such as polypropylene.

In operation, bores 26 are made within an exposed beam 28 of the house or other structure, typically by drilling. The diameter of the bores 26 is chosen to closely match the diameter of the elongate housing 14. Once the bores 26 are made in the exposed beam 28, a device is inserted into each bore 26. Where the elongate housing 14 of each device is slightly tapered, the devices are installed into the bores 26 by inserting the rearward end 22 of each device into a bore 26 first. A suitable glue can also be used to assure that each device 10 is firmly retained within a bore 26.

Figure 4:
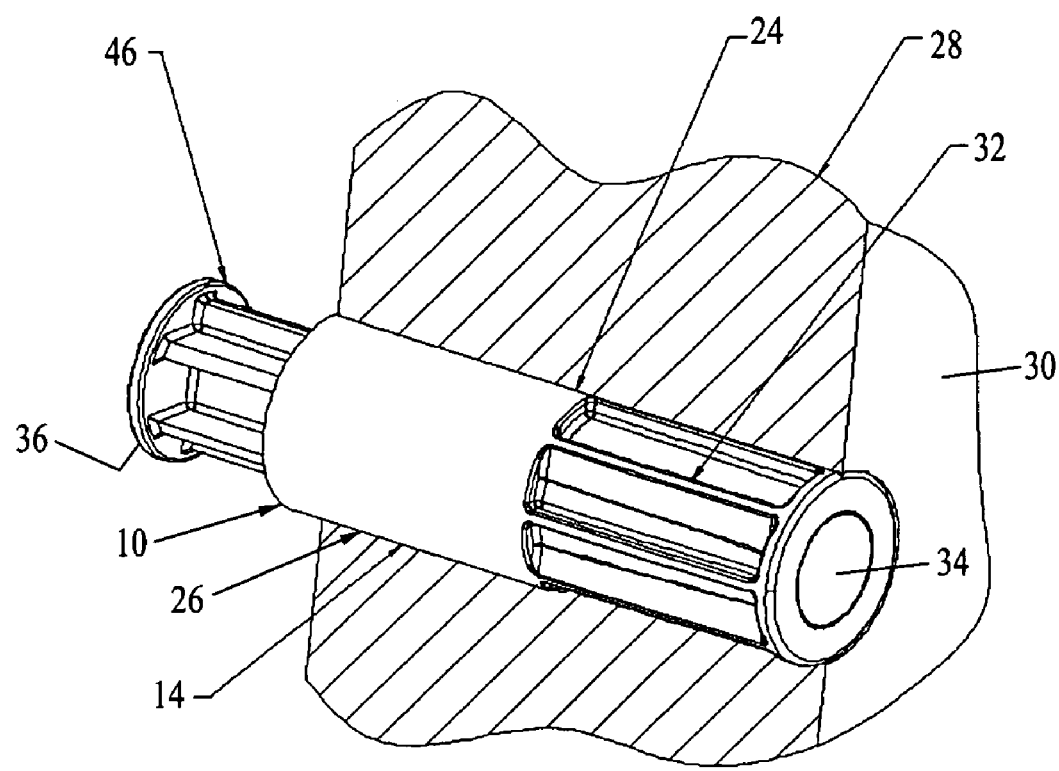
FIG. 4 is a perspective view of the device illustrated in FIG. 1 illustrating the installation of the device within a house or other structure.

As illustrated in FIG. 4, it is preferable that the forward end 20 of the elongate housing 14 be disposed substantially flush with the external surface 24 of the exposed beam 28, so that the device 10 is not unsightly when not in use.

Typically, the rearward end 36 of the interior member 16 is exposed at a reverse surface of the exposed beam 28, so as to provide a button 46 for facilitating the movement of the interior member 16 within the elongate housing 14.

Figure 5:
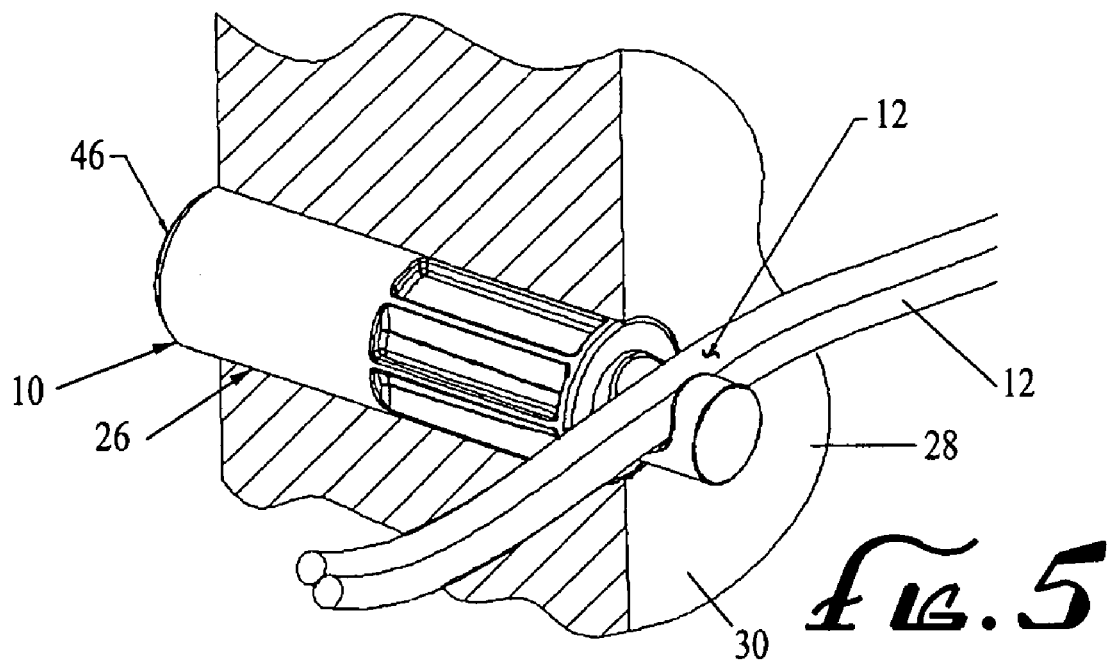
FIG. 5 is a perspective view of the device illustrated in FIG. 4 illustrating the disposition of two electrical wires into the notch while the notch is in the open position.
Figure 6:
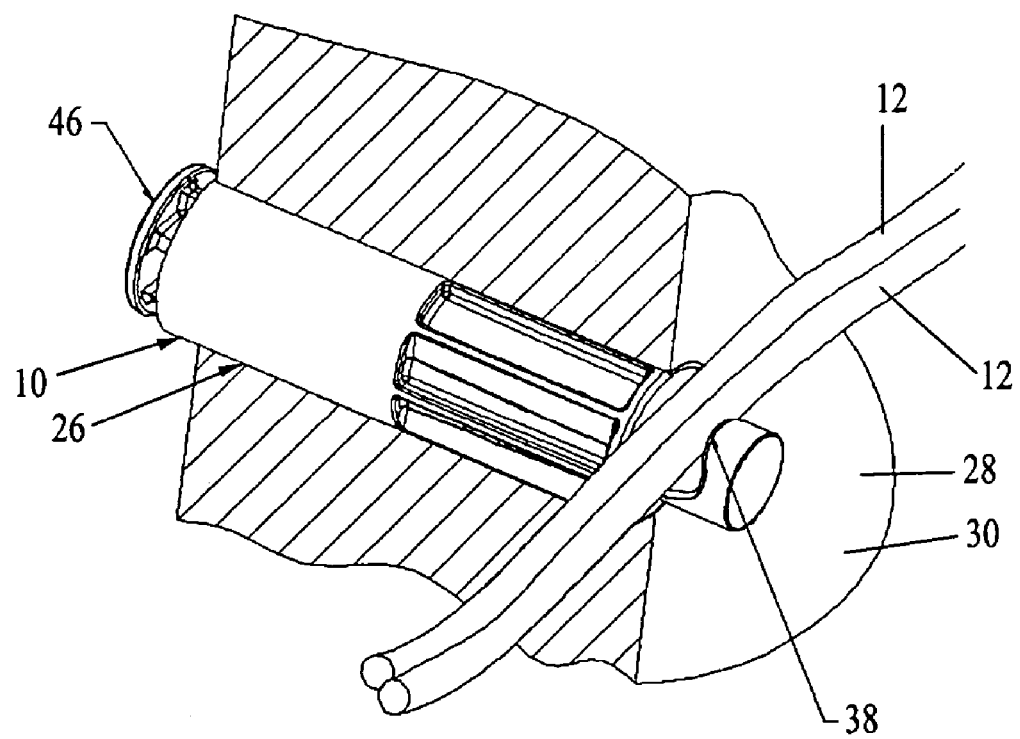
FIG. 6 is a perspective view of the device illustrated in FIG. 5 illustrating the device shown in FIG. 5 after the notch is biased towards a closed position.

Once a plurality of devices 10 are installed in bores 26 along an exposed beam 28 of the house or other structure, each interior member 16 of each device 10 is moved, in turn, from the closed position to the open position, as illustrated in FIG. 5. While in the open position, one or more cords 12 are disposed into the notch 38 of each device 10. After the one or more cords 12 have been strung within a notch 38 of a device 10, the interior member 16 of that device 10 is allowed to be biased towards the closed position, as illustrated in FIG. 6, whereby the cord 12 is firmly retained by the device 10.

Having thus described the invention, it should be apparent that numerous structural modifications and adaptations may be resorted to without departing from the scope and fair meaning of the instant invention as set forth hereinabove.

What is claimed is:

1. A device useful in the installation and removal of cords to and from a house or other structure, the device comprising:
   (a) an elongate housing having a forward end, a rearward end, a length of between about ¼ inch and about 3 inches and a maximum thickness of between about ¼ inch and 1 inch;
   (b) an interior member slidably disposed within the housing, the interior member having a forward end, a rearward end, and a notch defined proximate to its forward end, the notch being sized and dimensioned to accept and retain at least one electrical wire, the interior member being slidable within the housing between (i) a closed position wherein the notch is at least partially disposed within the housing and (ii) an open position wherein the notch is disposed sufficiently outside of the housing to allow its access to a cord; and
   (c) biasing means disposed within the housing and adapted to bias the interior member towards the closed position;

wherein, the forward end of the interior member is flush with the forward end of the elongate housing when the interior member is in the closed position;

whereby, when a cord is disposed within the notch, the biasing of the interior member towards the closed position firmly attaches the cord to the device.

2. The device of claim 1 wherein the elongate housing has a cylindrical exterior surface with a circular cross-section.

3. The device of claim 1 wherein the elongate housing is tapered, such that the forward end is slightly larger than the rearward end to facilitate the press fit of the device within a bore of constant diameter.

4. The device of claim 1 wherein the elongate housing has an external surface which defines a plurality of spaced-apart longitudinal ribs.

5. The device of claim 1 wherein the rearward end of the interior member protrudes rearwardly beyond the rearward end of the elongate housing when the interior member is disposed in the closed position.

6. The device of claim 1 wherein the notch is hook-shaped.

7. The device of claim 1 wherein, when the interior member is in the closed position, the notch is fully disposed within the housing.

8. The device of claim 1 wherein, when the interior member is in the open position, the notch is fully disposed outside of the housing.

9. The device of claim 1 wherein the interior member is rotatable within the elongate housing.

10. The device of claim 1 wherein the biasing means is a coil spring.

11. The device of claim 1 wherein the elongate housing and the interior member are made of a plastic material.

12. A device useful in the installation and removal of one or more cords to and from a house or other structure, the device comprising:
    (a) an elongate housing having a forward end, a rearward end, a length of between about ½ inch and about 3 inches and a maximum thickness of between about ¼ inch and ½ inch;
    (b) an interior member slidably disposed within the housing, the interior member having a forward end, a rearward end, and a hook-shaped notch defined proximate to its forward end, the notch being sized and dimensioned to accept and retain at least one cord, the interior member being slidable within the housing between (i) a closed position wherein the notch is at least partially disposed within the housing and (ii) an open position wherein the notch is disposed sufficiently outside of the housing to allow its access to a cord; and
    (c) a coil spring disposed within the housing and adapted to bias the interior member towards the closed position;

wherein, the forward end of the interior member is flush with the forward end of the elongate housing when the interior member is in the closed position;

whereby when a cord is disposed within the notch, the biasing of the interior member towards the closed position firmly attaches the cord to the device.

13. The device of claim 12 wherein the rearward end of the interior member protrudes rearwardly beyond the rearward end of the elongate housing when the interior member is disposed in the closed position.

14. The device of claim 12 wherein the interior member is rotatable within the elongate housing.

15. A method of retaining one or more cords to a house or other structure comprising the steps of:
    (a) providing the device of claim 1;
    (b) installing the device to a portion of the house or other structure such that the forward end of the interior member is accessible when the interior member is in the open position;
    (c) moving the interior member to the open position;
    (d) disposing the one or more cords into the notch; and
    (e) allowing the biasing means to bias the interior member towards the closed position, whereby the one or more cords are firmly retained to the device.

16. The method of claim 12 wherein the device is installed within the house or other structure such that the rearward end of the interior member is accessible and wherein the moving of the interior member to the open position in step (c) is accomplished by pushing on the rearward end of the interior member.

17. The method of claim 12 wherein the house or other structure comprises an eave and wherein the device is installed within the eave.

18. The method of claim 17 wherein, when the interior member is in the closed position, the device is disposed substantially flush with a side of the eave.

19. The device of claim 12 wherein the elongate housing has an external surface which defines a plurality of spaced-apart longitudinal ribs.

20. The device of claim 1 wherein the elongate housing is tapered, such that the forward end is slightly larger than the rearward end to facilitate the press fit of the device within a bore of constant diameter.

* * * * *